US 7,552,319 B2

(12) United States Patent
Matheny

(10) Patent No.: US 7,552,319 B2
(45) Date of Patent: Jun. 23, 2009

(54) METHODS AND APPARATUS TO MANAGE MEMORY ACCESS

(75) Inventor: David Matheny, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/880,830

(22) Filed: Jun. 30, 2004

(65) Prior Publication Data

US 2006/0004975 A1    Jan. 5, 2006

(51) Int. Cl.
*G06F 15/177* (2006.01)
(52) U.S. Cl. .............................. 713/1; 713/2; 711/165; 711/202; 711/206
(58) Field of Classification Search .................. None
See application file for complete search history.

(56) References Cited

U.S. PATENT DOCUMENTS

| 4,896,289 | A  | * | 1/1990 | Svinicki et al. ............... 714/34 |
| 6,401,202 | B1 | * | 6/2002 | Abgrall ......................... 713/2 |
| 6,442,660 | B1 | * | 8/2002 | Henerlau et al. ............. 711/165 |
| 6,522,635 | B1 | * | 2/2003 | Bedwell ....................... 370/314 |
| 6,865,669 | B1 | * | 3/2005 | Mahmoud ...................... 713/1 |
| 6,910,113 | B2 | * | 6/2005 | Natu ............................ 711/165 |
| 2006/0020936 | A1 | * | 1/2006 | Wyatt ........................... 717/162 |

OTHER PUBLICATIONS

Unix Manual Page for mv, Apr. 22, 2003, University of Wolverhampton, pp. 1-4.*
"BIOS." PC-Pages. pp. 1-2. Accessed on the Internet on Mar. 8, 2004 <URL http://www.pc-pages.co.uk/bios/bios.htm>.
Delorie, D. "Hardware Interrupts." Delorie Software. p. 1. Updated Feb. 1999. Accessed on the Internet on Mar. 8, 2004 <URL http://www.delorie.com/djgpp/doc/dpmi/ch4.4.2.html>.
Tyson, J. "How BIOS Works." Howstuffworks. pp. 1-5. Accessed on the Internet on Mar. 8, 2004 <URL: http://computer.howstuffworks.com/bios.htm/printable>.
"What is BIOS and how do I upgrade it?" G4techTV. pp. 1-3. Publication date Dec. 4, 1998. Accessed on the Internet on Mar. 8, 2004 <URL http://www.g4techtv.com/techtvvault/features/6778/What_is_BIOS_and_how_do_I_upgrade_it.html>.
"What is BIOS? (Mini-FAQ)." SysOpt. pp. 1-3. Accessed on the Internet on Mar. 8, 2004 <URL http://www.sysopt.com/biosdef.html>.
White Paper. "What is PXE?" 3Com Corporation, Santa Clara, CA, Apr. 2001. pp. 1-8. Accessed on the Internet on Mar. 8, 2004 <URL http://www.argontechnology.com/forum/upload/3.pdf>.

* cited by examiner

*Primary Examiner*—Hyung S Sough
*Assistant Examiner*—Kaushikkumar Patel
(74) *Attorney, Agent, or Firm*—Hanley, Flight and Zimmerman, LLC

(57) ABSTRACT

An example method involves detecting a memory relocation process and disabling memory access to a memory block in response to detecting the memory relocation process. The example method also involves determining an absolute address value associated with the memory block and storing the absolute address value.

27 Claims, 7 Drawing Sheets

METHODS AND APPARATUS TO MANAGE MEMORY ACCESS

FIELD OF THE DISCLOSURE

The present disclosure relates generally to processor systems and, more particularly, to methods, apparatus, and articles of manufacture to manage memory access.

BACKGROUND

Processes, operations, and hardware devices of a processor system typically use memory devices to store information. In a pre-boot environment (i.e., prior to booting an operating system), a processor typically executes pre-boot firmware or software instructions associated with initializing various portions of a processor system. Such pre-boot instructions may be part of, for example, a basic input output system (BIOS), initialization processes of hardware devices (e.g., network devices, display devices, input devices, etc.), etc. Typically, when executed, at least some pre-boot instructions cause a processor to initialize memory devices for storing information. After initialization of the memory devices, any process or operation of the processor system may allocate one or more blocks of memory (i.e., memory blocks) within the memory devices.

Memory blocks in the memory devices may be accessed using any memory addressing technique including indirect memory addressing and direct memory addressing. A selected memory addressing technique may be particularly suited for a specific memory configuration or memory use model. For example, indirect memory addressing may be used in connection with a memory use model in which contents in the memory blocks within a memory device are relocated or shifted during operation of the processor system. More specifically, one example of indirect memory addressing involves addressing memory locations using an address offset from a base address. In general, the base address indicates a starting point address in memory and the address offset indicates the number of memory addresses between the base address and the address corresponding to the memory location at which the first byte of the particular memory block is stored. In some indirect memory addressing implementations, a table is used to store address offset values, each of which may be used to access information in a respective memory location or memory block. An address computation process may be used to add the address offset to the base address to determine the address at which the first byte of the particular memory block is stored. A process or operation with which the memory block is associated need only store the address offset to access the particular memory block because the address computation process is aware of the base address. When one or more memory blocks are relocated or shifted due to an expansion or contraction of allocated memory, the base address may be updated by a memory relocation process to reflect the new general location of the memory blocks. In this manner, relocation of memory blocks is transparent to any process or operation that uses indirect memory addressing.

In contrast to indirect addressing techniques, direct memory addressing involves using absolute addresses of particular contents stored in memory and may result in lower memory access latencies (i.e., faster memory access speeds) because an address computation process is not required to determine the location of a memory block. In this manner, an operation or process may use an absolute address to directly access an exact address of a respective memory block. An apparent problem associated with direct memory addressing is that when a memory block is relocated or shifted due to an expansion or contraction of allocated memory, an absolute address used to access the memory block must be updated.

Memory use associated with processes or operations of a processor system typically use indirect addressing to better handle memory block relocation and/or memory size changes. For example, in a pre-boot environment, BIOS and other firmware associated with hardware device initialization use indirect memory addressing to access a conventional memory for storing information that needs to be readily accessible. In the pre-boot environment, initialization processes for hardware devices or other portions of a processor system typically allocate many memory blocks in the conventional memory. Each time a memory block is allocated, a memory relocation process relocates or shifts existing memory blocks to relinquish space for a recently allocated memory block. Accesses to memory by processes or operations that use indirect memory addressing are typically not affected by the relocation of memory.

Although indirect memory addressing is well-suited for accessing memory blocks that are frequently relocated, processes that use direct memory addressing to access similar memory blocks often experience erroneous memory accesses after a memory relocation process. In particular, a memory relocation process typically handles relocation using indirect memory addressing and, therefore, is typically not aware of the location at which a process stores an absolute address corresponding to a respective memory block. As a result, during relocation of memory, a memory relocation process cannot update absolute addresses associated with relocated memory blocks of specific processes or operations that use direct memory addressing. Accordingly, memory relocation often results in erroneous addressing of information by processes or operations using direct memory addressing.

DETAILED DESCRIPTION

Figure 1:
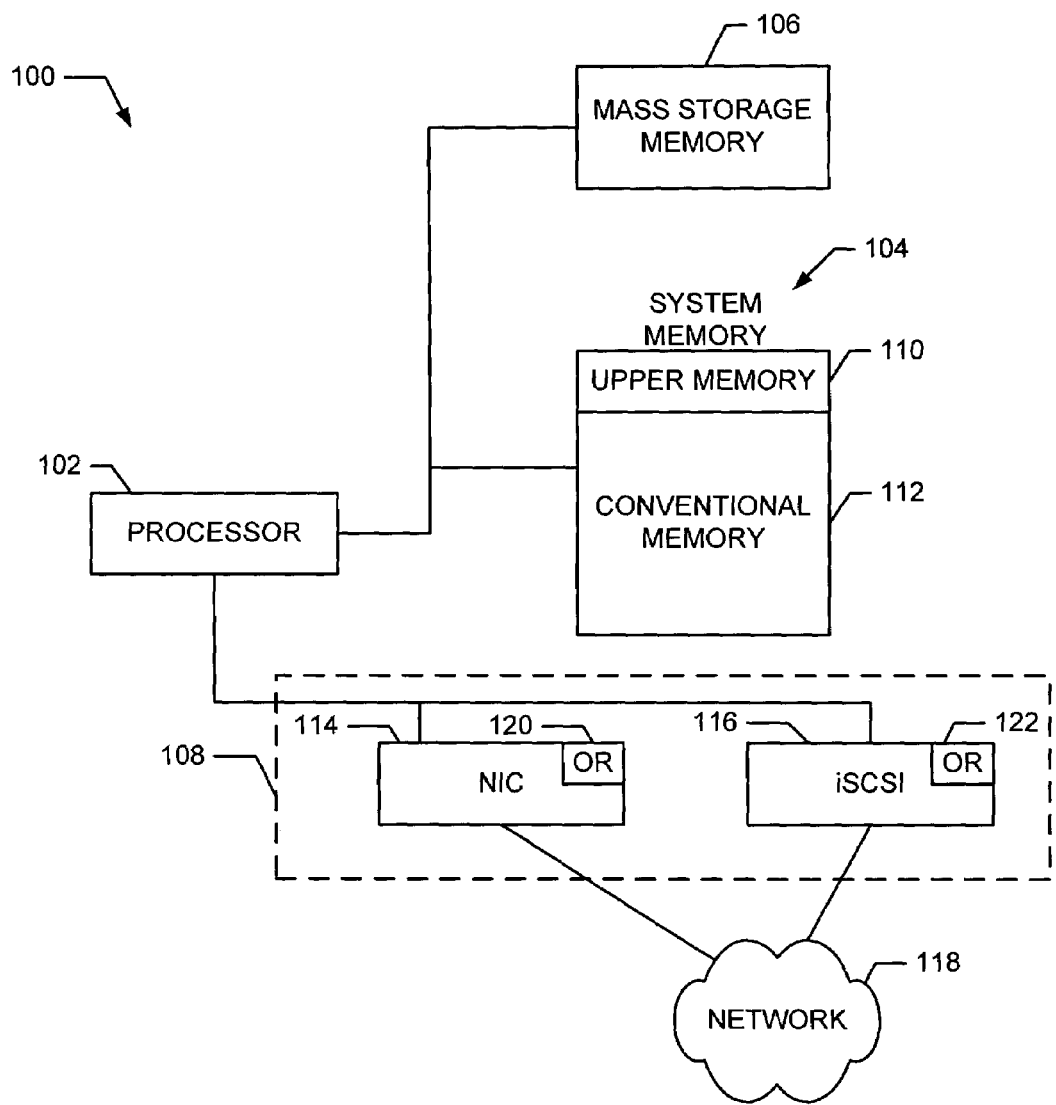
FIG. 1 is a diagram illustrating an example processor system.

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

The example methods and apparatus described herein may be used to manage memory accesses to blocks of memory (e.g., memory buffers that are accessed using direct addressing) that are shifted or relocated by memory relocation processes as memory grows to accommodate storage demands. For example, memory relocation processes may relocate blocks of memory (i.e., memory blocks) when a process (e.g., a software process, a firmware process, etc.) or a hardware device requests allocation of a new memory block. In general, memory blocks may be initialized and used by processes or operations of a processor system to store information. Although a memory block may have no information stored therein, some or all of the memory available in each memory block may be used to store information. Any information stored in the memory blocks may be accessed using various memory addressing techniques including indirect memory addressing and direct memory addressing. In some cases, as described below, direct memory addressing is used to achieve low memory access latencies for processes or operations that require quick memory access.

After memory blocks are relocated, addresses at which the memory blocks are located are different from the addresses at which the memory blocks were located prior to the memory relocation process. Thus, the memory blocks need to be accessed using updated addresses. In particular, the example methods and apparatus described herein may be used to inhibit memory access during memory relocation and update addresses (e.g., absolute addresses) that are used to access memory blocks using direct memory addressing.

Before proceeding with a description of the example methods and apparatus for managing memory access, example implementations of indirect memory addressing and direct memory addressing are described. A well-known method for implementing indirect memory addressing involves storing and using a base address and an address offset. A base address is generally associated with the starting address at which a group or an array of memory blocks is located within memory. An address offset is uniquely associated with the memory location at which a first byte of a single memory block is located within an array of memory blocks. Indirect memory addressing may be used to access information stored in a desired memory block by performing an address computation process based on an address offset and a base address. More specifically, the address computation process may be used to add an address offset associated with the desired memory block to a base address associated with an array of memory blocks within which the desired memory block is located. In this manner, an absolute address may be determined and used to access information stored in the desired memory block.

A base address is generally stored in a fixed memory location that may be accessed by many processes and/or hardware devices and an address offset is typically stored in a memory location that is always known by the process or hardware device associated with that address offset. After a memory relocation process relocates an array of memory blocks, successful accesses to the memory blocks within the array may be ensured by updating the base address to correspond with the starting address of the array of memory blocks. A process or operation may then access a desired memory block by adding the address offset of the desired memory block to the updated base address.

A well-known method for implementing direct memory addressing involves using an absolute address. Direct memory addressing is typically used by processes, operations, or hardware devices that access memory blocks directly, thus bypassing any address computation process such as that used for indirect memory addressing as described above. For direct memory addressing, an absolute address is typically stored in a memory location that is always known to a respective process, operation, and/or hardware device. For example, as described in greater detail below, a hardware device may include an address register that is used to store an absolute address. The hardware device may retrieve the absolute address from the address register and directly access a memory block located at the absolute address. During a memory relocation process, any memory location or address register used by a process, operation, or hardware device to store an absolute address may often not be accessible by the memory relocation process, thus causing the absolute address to differ from the new location of a respective memory block. To minimize or prevent erroneous memory accesses, the example methods and apparatus described herein may be used to manage memory accesses during memory relocation processes by detecting memory relocation and updating absolute addresses to indicate new locations of respective memory blocks that are relocated before allowing such addresses to be accessed.

Now, turning in detail to FIG. 1, an example processor system 100 may be used to implement the example methods and apparatus described herein. In particular, as shown in FIG. 1, the example processor system 100 includes a processor 102, a system memory 104, a mass storage memory 106, and a plurality of hardware devices 108, all of which are communicatively coupled as shown. In addition, although not shown, the processor system 100 may include any other device or devices configured to operate in combination with a processor system.

The example processor system 100 may be, for example, a conventional desktop personal computer, a notebook computer, a workstation or any other computing device. The processor 102 may be any type of processing unit such as, for example, a general purpose processor. In particular, the processor 102 may be a microprocessor from the Intel® Pentium® family of microprocessors, the Intel® Itanium® family of microprocessors, and/or the Intel XScale® family of processors. In a multi-processor system, a plurality of processors that are substantially similar or identical to the processor 102 may be communicatively coupled to one another.

The system memory 104 may be used to store information (e.g., variables, parameters, instructions, data, etc.). For example, the system memory 104 may be used to store information by processes, operations, etc. of the processor 102 and/or the plurality of hardware devices 108. The system memory 104 may be implemented using any volatile or non-volatile memory. For example, the system memory 104 may be implemented using any random access memory (RAM) including a dynamic random access memory (DRAM), a double data rate random access memory (DDRAM), static random access memory (SRAM), and/or any other volatile memory. Additionally or alternatively, the memory 104 may be a flash memory and/or any other writeable non-volatile memory. In addition, the system memory 104 includes an upper memory 110 and a conventional memory 112, both of which are described in greater detail below in connection with FIG. 2.

The mass storage memory 106 may be, for example, a hard drive, an optical drive, etc., that may be used to store software and/or firmware (e.g., an operating system, applications, drivers, etc.) Although not shown, the mass storage memory 106 and/or the system memory 104 may be communicatively couple to the processor 102 via a memory controller (not shown).

The plurality of hardware devices 108 includes a network interface card (NIC) 114 and an internet small computer system interface (iSCSI) device 116, both of which are communicatively coupled to the processor 102 and a network 118. In particular, the NIC 114 and the iSCSI device 116 may transmit and receive information via the network 118. The NIC 114 may be, for example, an Ethernet device, an asynchronous transfer mode (ATM) device, an 802.11 device, etc. that enables the processor 102 to communicate with a plurality of devices (e.g., processor systems, hardware devices, etc.) (not shown) that are communicatively coupled to the network 118. The iSCSI device 116 may be used to communicate SCSI commands via the network 118 to other processor systems (not shown) or other devices (not shown) that are communicatively coupled to the network 118.

The network 118 may be, for example, a local area network (LAN), a wide area network (WAN), the Internet, etc. Additionally, the network 118 may be any wired or wireless network.

As shown in FIG. 1, the NIC 114 includes an option ROM (OR) 120 and the iSCSI device 116 includes an option ROM 122. In general, the option ROMs 120 and 122 are used to store information (i.e., option ROM contents) that may include, for example, machine accessible instructions (e.g., firmware) and data (e.g., variables, parameters, etc.) associated with configurations and/or operations of the devices 114 and 116. In a pre-boot environment, the processor 102 may read OR contents from the ORs 120 and 122 and store the OR contents in the upper memory 110 for subsequent execution. The OR contents may include firmware instructions that, when executed by the processor 102, may cause the processor 102 to perform processes or operations that, for example, configure the devices 114 and 116, initializes memory blocks in the system memory 104, configure other portions of the processor system 100, etc.

In a pre-boot environment, the devices 114 and 116 are often used to establish communication links with one or more devices or processor systems communicatively coupled to the network 118. An example use for these communication links may include receiving large amounts of information that need to be stored in memory (e.g., the system memory 104) in a timely manner. One technique for storing the information involves allocating one or more memory blocks (e.g., the hardware mapped buffer 218 described below in connection with FIG. 2) in, for example, the system memory 104 and using direct memory addressing to reduce memory access time (i.e., reduce memory access latency) when accessing the allocated memory blocks.

In some instances, communication links established by, for example, the devices 114 and 116 are maintained for long durations. For example, in a pre-boot environment, the iSCSI 116 may be used to communicate with a boot disk (not shown) via the network 118 and may need to maintain a communication link with the boot disk for the duration of, for example, a power on self-test (POST) operation and/or a boot process. During this time, memory blocks that are accessed by the devices 114 and 116 may be relocated one or more times by a memory relocation process, thereby changing the addresses at which the memory blocks are located within memory (e.g., the system memory 104). The example methods described in connection with FIGS. 3 and 5 may be used to manage accesses to the memory blocks that are relocated by the memory relocation process.

Figure 2:
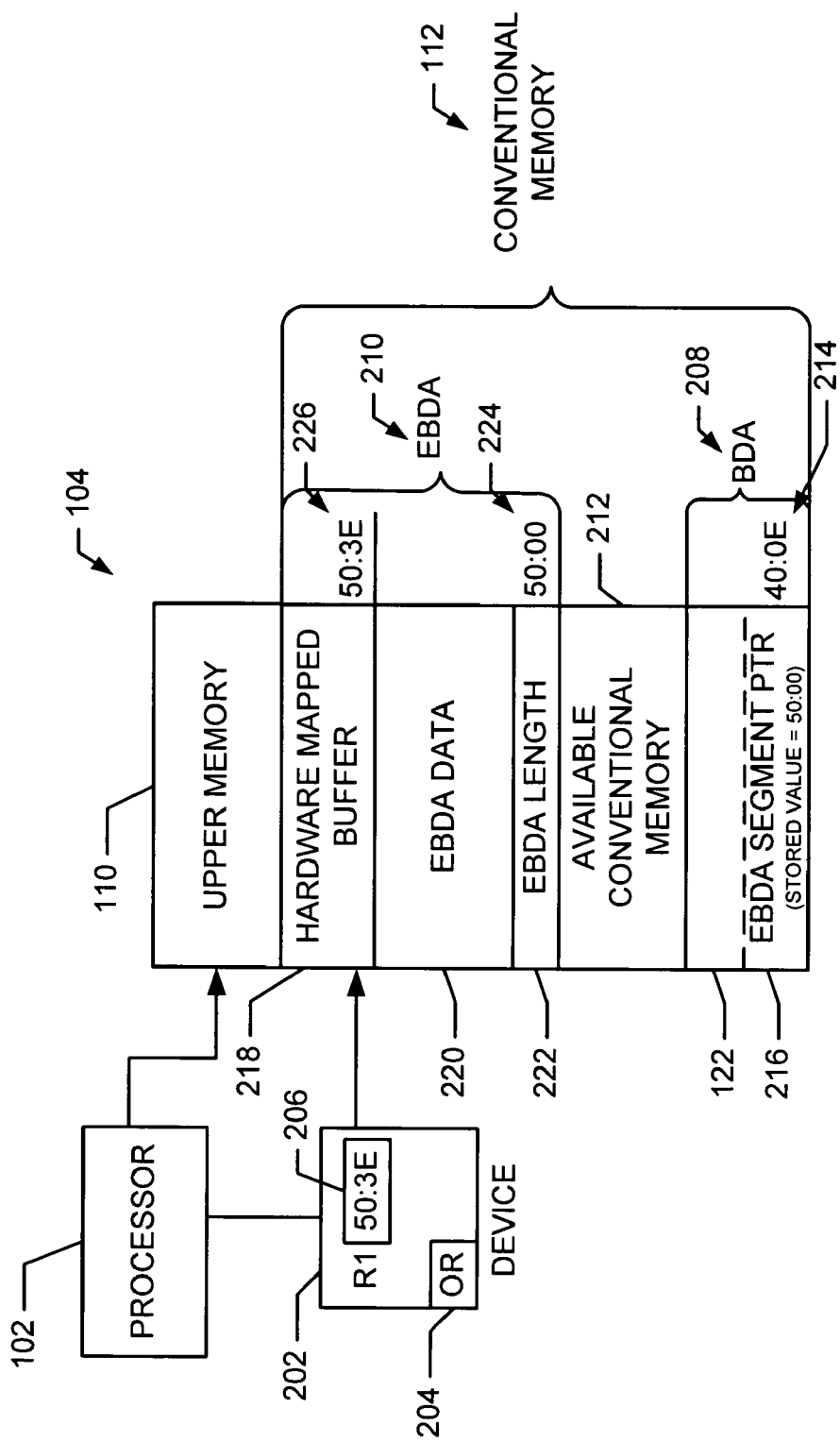
FIG. 2 is a detailed block diagram of the system memory of FIG. 1 and an example memory access configuration thereof.

FIG. 2 is a detailed block diagram of the system memory 104 of FIG. 1 and an example memory access configuration thereof. In particular, the memory access configuration is shown relative to the processor 102 and a hardware device 202. In the example memory access configuration of FIG. 2, the processor 102, the system memory 104, and the device 202 may be communicatively coupled as shown. The system memory 104 includes the upper memory 110 and the conventional memory 112. The upper memory 110 and the conventional memory 112 are typically established or allocated in a pre-boot environment. For example, in the pre-boot environment, the processor 102 may execute instructions (e.g., firmware) associated with a basic input output system (BIOS) that cause the processor 102 to allocate or establish the upper memory 110 and the conventional memory 112.

The device 202 is shown as being communicatively coupled to the conventional memory 112 to indicate that the device 202 may access one or more memory blocks (e.g., the hardware mapped buffer 218) in the conventional memory 112 using direct memory addressing. However, in some implementations the device 202 may be configured to access the conventional memory 112 via the processor 102. In other implementations, the device 202 may be configured to access the conventional memory 112 via, for example, a direct memory access (DMA) channel. The DMA channel may be provided by a memory controller (not shown), which may be integral with the processor 102 or provided as a separate integrated circuit.

The device 202 may be substantially similar or identical to one or both of the devices 114 and 116 of FIG. 1. In particular, the device 202 includes an OR 204 and an address register 206. The OR 204 may be substantially similar or identical to the ORs 120 and 122 of FIG. 1. Option ROM contents stored in the OR 204 may be read and stored in the upper memory 110 by the processor 102. The address register 206 may be used to store an absolute address that indicates the location of a memory block (e.g., the hardware mapped buffer 218) in the conventional memory 112 and may be used by the device 202 to access the memory block using direct memory addressing.

The conventional memory 112 includes a BIOS data area (BDA) 208, an extended BDA (EBDA) 210, and available conventional memory 212. In general, the BDA 208 is allocated or established in a pre-boot environment by the processor 102 upon execution of BIOS instructions and may be located at a BDA starting address 214, which is shown by way of example as address 40:0E. A fixed size of memory is typically allocated for the BDA 208. For example, in some implementations, the BDA 208 includes 240 bytes of the conventional memory 112. The BDA 208 may be used by BIOS processes and OR content processes to store information associated with respective operations. In particular, the BDA 208 may be used to store an EBDA segment pointer 216 within a memory location corresponding to the BDA starting address 214. The EBDA segment pointer 216 is used to store a base address (e.g., a starting address) at which a first byte of the EBDA 210 is located. For example, in FIG. 2, the base address stored in the EBDA segment pointer 216 is 50:00.

As described above, the BDA 208 includes a fixed amount of memory. When more space is needed than is available in the BDA 208, the EBDA 210 may be established or initialized by allocating a memory block in the conventional memory 112 that can be dynamically resized. When more memory blocks are needed, the EBDA 210 may be expanded by allocating more memory in the available conventional memory 212. The EBDA 210 may be used by operations or processes of, for example, OR contents, BIOS, and the device 202 to store information.

The EBDA 210 includes the hardware mapped buffer 218, an EBDA data area 220, and an EBDA length area 222, all of which are stored in the conventional memory 112 starting at an EBDA base address 224. The EBDA base address 224 is shown by way of example as address 50:00, which is the value stored in the EBDA segment pointer 214 as shown in FIG. 1. The hardware mapped buffer 218 is located at the hardware mapped buffer starting address 226, which is shown by way of example as address 50:3E. In general, the hardware mapped buffer 218 may be allocated in response to a request from an OR content process and is accessed by the device 202 using direct memory addressing. For example, the device 202 may perform operations that receive information via a network (e.g., the network 118 of FIG. 1) and need to store the information in a timely manner. In this case, the OR contents stored in the OR 204 may include instructions that cause the processor 102 to allocate the hardware mapped buffer 218 and allow the device 202 to directly access the hardware mapped buffer 218 using direct memory addressing. Although one hardware mapped buffer (e.g., the hardware mapped buffer 218) is shown in FIG. 2, any number of hardware mapped buffers may be allocated in the EBDA 210.

The process or operation that invokes allocation of the hardware mapped buffer 218 may be configured to determine and/or store an address offset indicating the memory location at which the first byte of the hardware mapped buffer 218 is stored relative to the EBDA base address 224. The address offset may be stored in a memory location having an address that is not affected by memory relocation processes that relocate memory blocks in the EBDA 210. For example, the address offset may be stored in the upper memory 110. The address offset may then be used in combination with an address update process (e.g., the address update process 312 described below in connection with FIGS. 3 and 5) to determine an absolute address at which the hardware mapped buffer 218 is stored after a memory relocation process by adding the address offset to the EBDA base address 224. The EBDA base address 224 may be stored in the EBDA segment pointer 216 and may be obtained by reading the contents of the EBDA segment pointer 216.

One or more EBDA data areas similar to the EBDA data area 220 may be allocated by processes or operations of OR contents and may be used to store parameters, variables, addresses, etc. The EBDA length area 222 may be used to store the length or size of the EBDA 210. The EBDA data area 220 and the EBDA length area 222 are typically accessed using indirect addressing.

As the EBDA 210 expands (i.e., more memory block is allocated for the EBDA 210), the information stored in the EBDA 210 (e.g., the hardware mapped buffer 218, the EBDA data area 220, and the EBDA data length memory location 222) is relocated or shifted within the conventional memory 112. More specifically, the EBDA 210 is expanded into the available conventional memory 212. For example, allocating memory for another hardware mapped buffer may cause the memory blocks stored in the EBDA 210 to be shifted to lower-addressed memory locations (e.g., memory locations within the available conventional memory 212). After information in the EBDA 210 is shifted or relocated, the EBDA segment pointer 216 is updated to reflect a new address at which the first byte of the EBDA 210 is stored (i.e., the EBDA base address 224). A change in the content of the EBDA segment pointer 216 indicates that the EBDA base address 224 has changed. In addition, the EBDA length area 222 is updated to indicate a new size of the EBDA 210.

Figure 3:
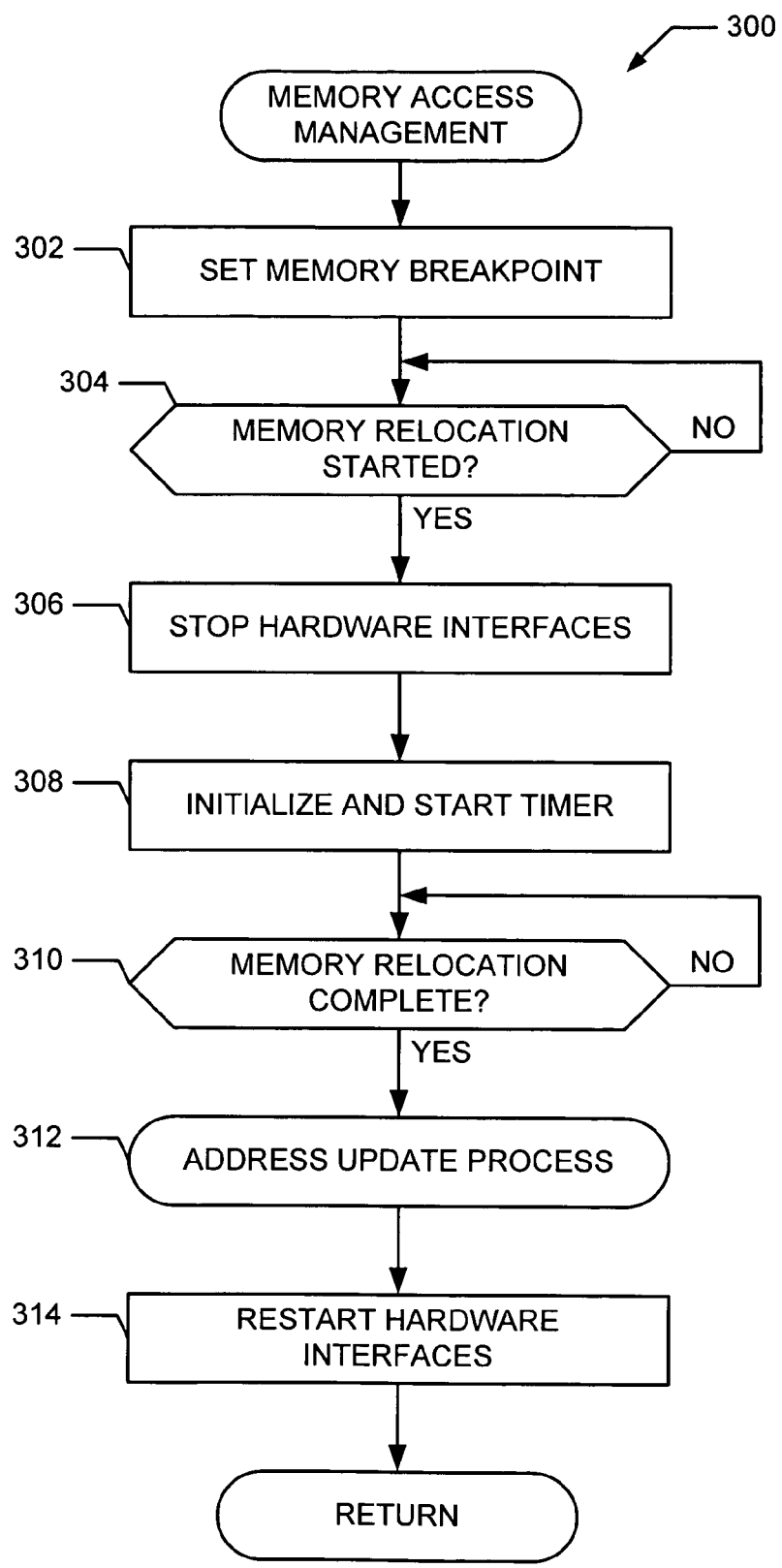
FIG. 3 is a flow diagram of an example memory access management process that may be performed during a memory relocation process.
Figure 5:
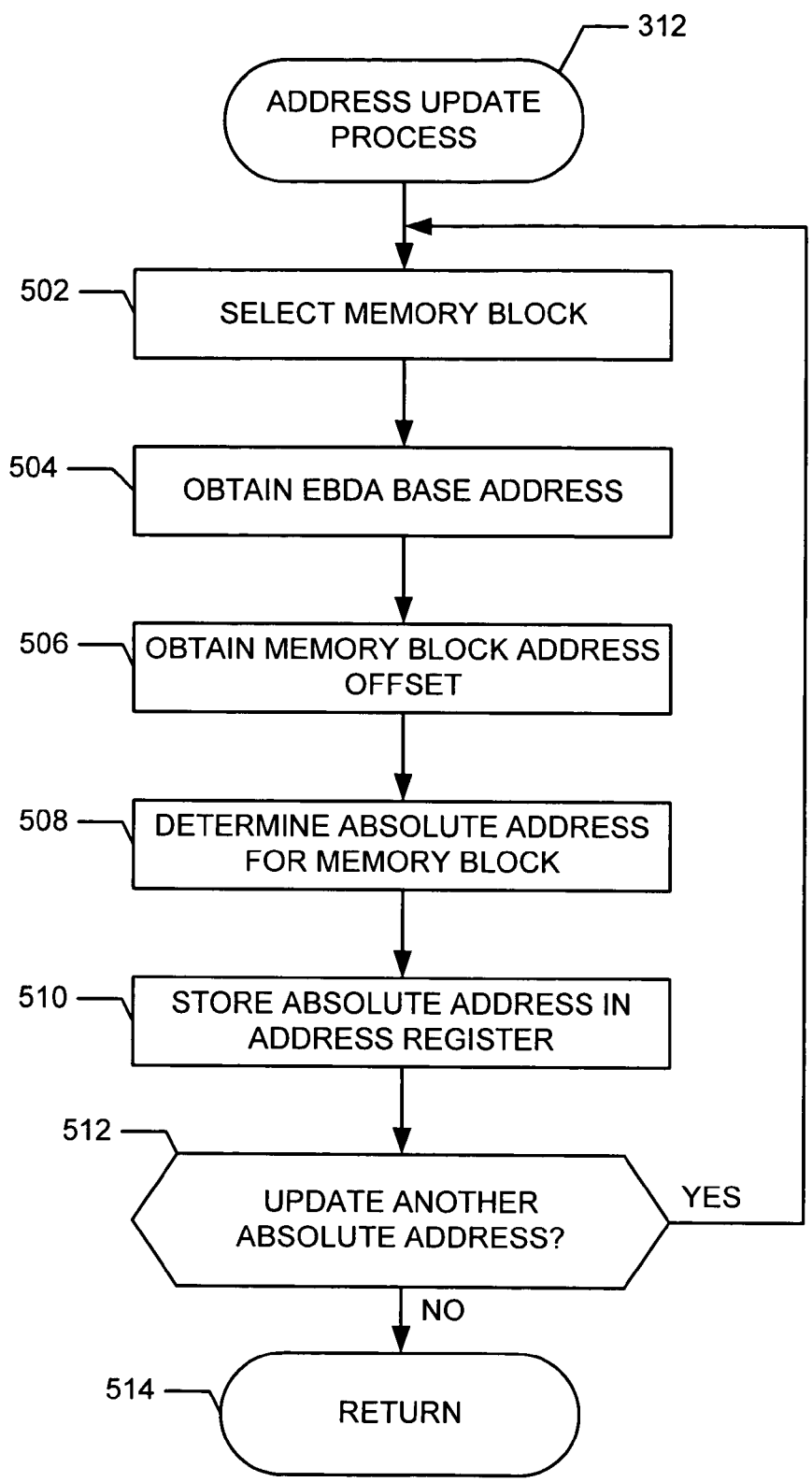
FIG. 5 is a flow diagram of an example update address process that may be used to update one or more absolute addresses that may be used to access information using direct memory addressing.

When the hardware mapped buffer 218 is relocated or shifted to a new address, the example processes of FIGS. 3 and 5 may be used to update the absolute address stored in the address register 206 before a device (e.g., the device 202) incorrectly accesses the incorrect address. In this manner, the device 202 may continue to directly access the information stored in the hardware mapped buffer 218 using direct memory addressing.

FIG. 3 is a flow diagram of an example memory access management process 300 that may be performed during a memory relocation process. In particular, the example memory access management process 300 (i.e., the example process 300) may be used to detect a memory relocation process and manage accesses to information stored in the EBDA 210 (FIG. 2) during the memory relocation process. In this manner, absolute addresses (e.g., an absolute address stored in the address register 206 of FIG. 2) used to access information using direct memory addressing can be updated. In one example, the example process 300 may be used in a pre-boot environment to manage memory accesses by the hardware device 202 (FIG. 2) to the hardware mapped buffer 218 (FIG. 2). The example process 300 may be implemented using hardware, software, firmware, and/or any combination thereof. In addition, software and/or firmware used to implement the example process 300 may be executed on a processor system such as, for example, the processor system 100 of FIG. 1.

Initially, a memory breakpoint is set at the EBDA length area 222 and/or the EBDA segment pointer 216 (block 302). The memory breakpoint may be used to detect a memory relocation process, which may be invoked in response to a request to allocate a new memory block (e.g., another hardware mapped buffer, another EBDA data area, etc.) within the EBDA 210. As is known to those having ordinary skill in the art, a memory breakpoint typically causes an interrupt to be asserted when information is stored or changed in the memory location at which the memory breakpoint is set. For example, setting a memory breakpoint at the EBDA length area 222 may cause an interrupt to be asserted when the information stored in the EBDA length area 222 is modified following a memory relocation process to indicate the new memory length of the EBDA 210. Additionally, setting a memory breakpoint at the EBDA segment pointer 216 may cause an interrupt to be asserted when the base address stored in the EBDA segment pointer 216 is updated following a memory relocation process to indicate the new starting address of the EBDA 210. An example method for setting the memory breakpoint involves setting the memory breakpoint in a debug register that may be used in combination with a process that monitors accesses to memory locations.

The example process 300 may then determine if a memory relocation process has started (block 304). The memory relocation process may be detected using any suitable method including detecting or polling an interrupt associated with the memory breakpoint set in connection with the operation of block 302. More specifically, the information or value stored in an interrupt status register may be obtained and used to determine if the memory breakpoint set in connection with block 302 has asserted an interrupt. An alternative method for determining if the memory relocation process has started involves copying the information stored in the EBDA length area 222 and/or the EBDA segment pointer 216 to other memory locations prior to the memory relocation process. The information stored in the memory locations may then be compared to the information stored in the EBDA length area 222 and the EBDA segment pointer 216 to determine if the information stored in the EBDA length area 222 and/or the EBDA segment pointer 216 has changed, thus determining if the memory relocation process has started.

If it is determined at block 304 that the memory relocation process has not started, the operation of block 304 is repeated. After it is determined at block 304 that the memory relocation process has started, hardware devices (e.g., the devices 114 and 116 of FIG. 1 and the device 202 of FIG. 2) are prevented or disabled from accessing the EBDA 210 (block 306). For example, the hardware devices may be stopped from accessing the EBDA 210 by disabling respective hardware interfaces (e.g., any bus or transceiver of a hardware device communicatively coupled to the network 118 of FIG. 1, any bus or transceiver of a hardware device communicatively coupled to one or both of the processor 102 and the system memory 104 of FIG. 1, etc.).

The example process 300 may then initialize and start a timer to indicate when the memory relocation process is complete (block 308). For example, the timer may be configured to expire and assert an interrupt after a predetermined amount of time based on the duration of the memory relocation process. In this manner, the example process 300 may determine when to re-enable the hardware devices (e.g., the devices 114 and 116 of FIG. 1 and the device 202 of FIG. 2) to access the EBDA 210.

In some cases, prior to relocating or shifting memory blocks, the memory relocation process may disable or mask interrupts to prevent the memory relocation process from being interrupted by other processes or operations. In such cases, when relocation of memory blocks is complete, the memory relocation process may re-enable interrupts. Any interrupt that was asserted or pending during the memory relocation process may then be detected. This enables the timer set at block 308 to be set to expire at any time prior to the completion of the memory relocation process. Accordingly, detecting that the timer set at block 308 has asserted an interrupt indicates that interrupts have been enabled and that the memory relocation process has finished relocating or shifting memory blocks. Masking or disabling interrupts during the memory relocation process also enables using means other than a timer for asserting an interrupt. For example, a counter interrupt may be used by configuring a counter to assert an interrupt after a number of clock cycles have elapsed or after a count value accumulated by the counter is equal to or greater than a threshold count value. Causing an interrupt to be asserted and/or become pending during the memory relocation process enables the pending interrupt to be detected after interrupts are re-enabled, thus indicating that the memory relocation process is complete.

The example process 300 may then determine if the memory relocation process is complete (block 310) by, for example, receiving the timer interrupt described above. If it is determined at block 310 that the memory relocation process is not complete, the operation of block 310 is repeated while the process 300 waits for the memory relocation process to complete. After it is determined at block 310 that the memory relocation process is complete, which may be determined by receipt of an interrupt, an address update process is invoked (block 312). The address update process of block 312, may be used to update one or more absolute addresses used to access, for example, the hardware mapped buffer 218 using direct memory addressing. More specifically, the address update process of block 312 may be used to update the address stored in the address register 206 (FIG. 2) as described in greater detail below in connection with FIG. 5. After the absolute addresses are updated, the example process 300 re-enables hardware devices (e.g., the devices 114 and 116 of FIG. 1 and the device 202 of FIG. 2), which have had their addresses updated, to access the EBDA 210 (block 314).

Figure 4:
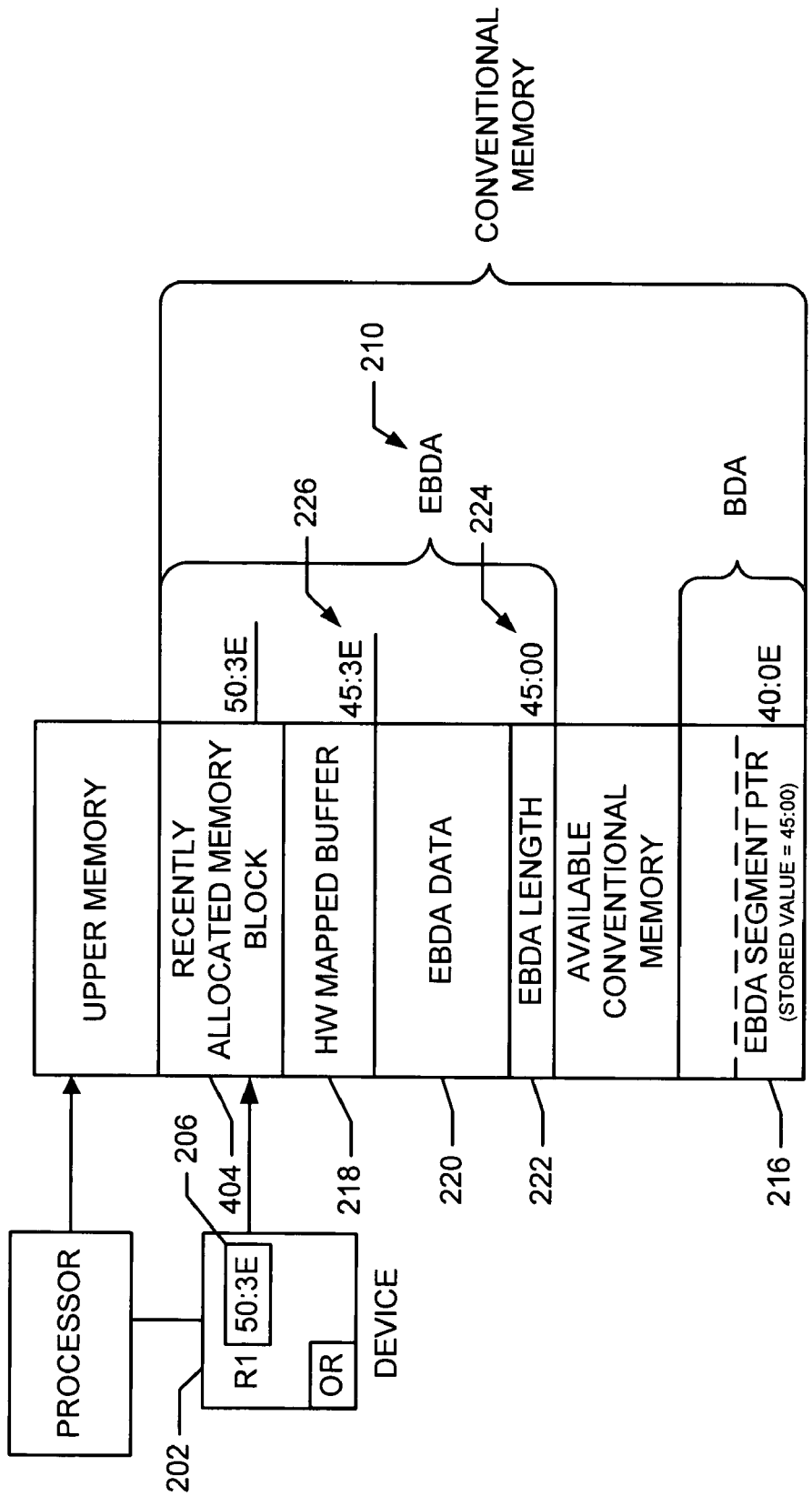
FIG. 4 is a diagram illustrating the conventional memory of FIG. 1 in a post-memory relocation configuration.

FIG. 4 is a diagram illustrating the conventional memory 112 of FIG. 1 in a post-memory relocation configuration. In particular, FIG. 4 depicts the EBDA 210 after execution of block 310 of FIG. 3, and before execution of the address update process of block 312 (FIG. 3). More specifically, FIG. 4 depicts the EBDA 210 after the hardware mapped buffer 218 and other information (e.g., the EBDA data area 220 and the EBDA length area 222) stored in the EBDA 210 are shifted or relocated to another memory location (e.g., a lower-addressed memory location).

As shown in FIG. 4, the hardware mapped buffer 218, the EBDA data 220, and the EBDA length area 222 are shifted or relocated within the EBDA 210 by, for example, a memory relocation process, to relinquish memory for a recently allocated memory block 404. The recently allocated memory block 404 may be another hardware mapped buffer or another EBDA data area and may be allocated by, for example, a process or operation of an OR content or BIOS.

After the memory relocation process, the EBDA base address 224 and the hardware mapped buffer starting address 226 are changed. In particular, the EBDA base address 224 is shown by way of example as being changed to address 45:00, which is the updated value stored in the EBDA segment pointer 216 as shown in FIG. 4. The hardware mapped buffer starting address 226 is shown by way of example as being changed to 45:3E.

After the memory relocation process, the recently allocated memory block 404 may be located at a higher-addressed memory block relative to the memory blocks (e.g., the hardware mapped buffer 218, the EBDA data area 220, and the EBDA length area 222) initially stored in the EBDA 210. Additionally, prior to the address update process of block 312 (FIG. 3), the address stored in the address register 206 corresponds to a memory location within the recently allocated memory block 404 as shown in FIG. 4. However, the information stored in the recently allocated memory block 404 may correspond to an operation or process associated with a device other than the device 202. As described above in connection with the operation of block 306 (FIG. 3), accesses to the EBDA 210 may be inhibited to minimize or prevent the device 202 from accessing information in memory blocks with which the device 202 is not associated until the address stored in the address register 206 is updated to account for the memory relocation.

As described in greater detail below in connection with FIG. 5, the address update process of block 312 (FIG. 3) may be used to update the absolute address stored in the address register 206 of the device 202. In this manner, when the device 202 is enabled to access the EBDA 210 as described above in connection with block 314 (FIG. 3), the device 202 can access information stored in a memory block with which the device 202 is associated such as, for example, the hardware mapped buffer 218.

FIG. 5 is a flow diagram of an example address update process (i.e., the address update process described above in connection with block 312 of FIG. 3) that may be used to update one or more addresses used to access information using direct memory addressing. In particular, the example address update process 312 (i.e., the example process 312) may be used to update absolute addresses stored in, for example, address registers (e.g., the address register 206 of FIGS. 2 and 4), and which are used by respective hardware devices (e.g., the device 202 of FIGS. 2 and 4) to access information in respective memory blocks (e.g., the hardware mapped buffer 218 of FIGS. 2 and 4). The example process 312 may be implemented using hardware, software, firmware, and/or any combination thereof. In addition, software and/or firmware used to implement the example process 312 may be executed on a processor system such as, for example, the processor system 100 of FIG. 1.

Initially, a memory block for which to update a respective absolute address may be selected (block 502). For example, if the address stored in the address register 206 (FIGS. 2 and 4) is to be updated, the hardware mapped buffer 218 may be selected. The EBDA base address 224 (FIGS. 2 and 4) is then obtained (block 504). After the information stored in the EBDA 210 is shifted during a memory relocation process as described above in connection with the example process 300 of FIG. 3, the EBDA base address 224 may be updated and stored in the EBDA segment pointer 216 (FIG. 2) by the memory relocation process. The EBDA base address 224 may then be obtained by reading the address stored in the EBDA segment pointer 216. For example, the address stored in the EBDA segment pointer 216 may be address 45:00, which corresponds to the EBDA base address 224 shown in FIG. 4.

A memory block address offset may then be obtained (block 506). The memory block address offset corresponds to the number of addresses between the EBDA base address 224 and the memory location at which the first byte of the memory block (e.g., the hardware mapped buffer 218 of FIGS. 2 and 4) selected at block 502 is stored. An example method for obtaining the memory block address offset involves configuring a process of an OR content to store the memory block address offset when the memory block is initially allocated as described above in connection with FIG. 2.

The absolute address indicating the location of the first byte of the memory block (e.g., the hardware mapped buffer 218 of FIGS. 2 and 4) selected at block 502 may then be determined (block 508). For example, the absolute address may be determined by adding the memory block address offset obtained at block 506 to the EBDA base address 224 (FIGS. 2 and 4). The absolute address may be determined to be address 45:3E, which corresponds to the location of the first byte of the hardware mapped buffer 218 after the memory relocation process as shown in FIG. 4. After the absolute address is determined, the absolute address may be stored in the address register 206 (FIGS. 2 and 4) (block 510). For example, if the absolute address is determined to be address 45:3E, the address stored in the address register 206 is address 45:3E as shown in FIG. 6.

It is then determined if another absolute address for any other memory block (e.g., any other hardware mapped buffer) needs to be updated (block 512). An example method that may be used at block 512 involves setting a count variable equal to the number of hardware mapped buffers allocated in the EBDA 210. Each time an absolute address is updated, an operation following block 510 may be used to decrement the value stored in the count variable. The count variable may then be compared to zero at block 512 to determine if absolute addresses corresponding to any hardware mapped buffers remain to be updated.

If it is determined at block 512 that another absolute address needs to be updated, control is passed back to block 502. However, if it is determined at block 512 that no other absolute address needs to be updated, the example process 312 returns control to, for example, block 314 of FIG. 3 (block 514).

Figure 6:
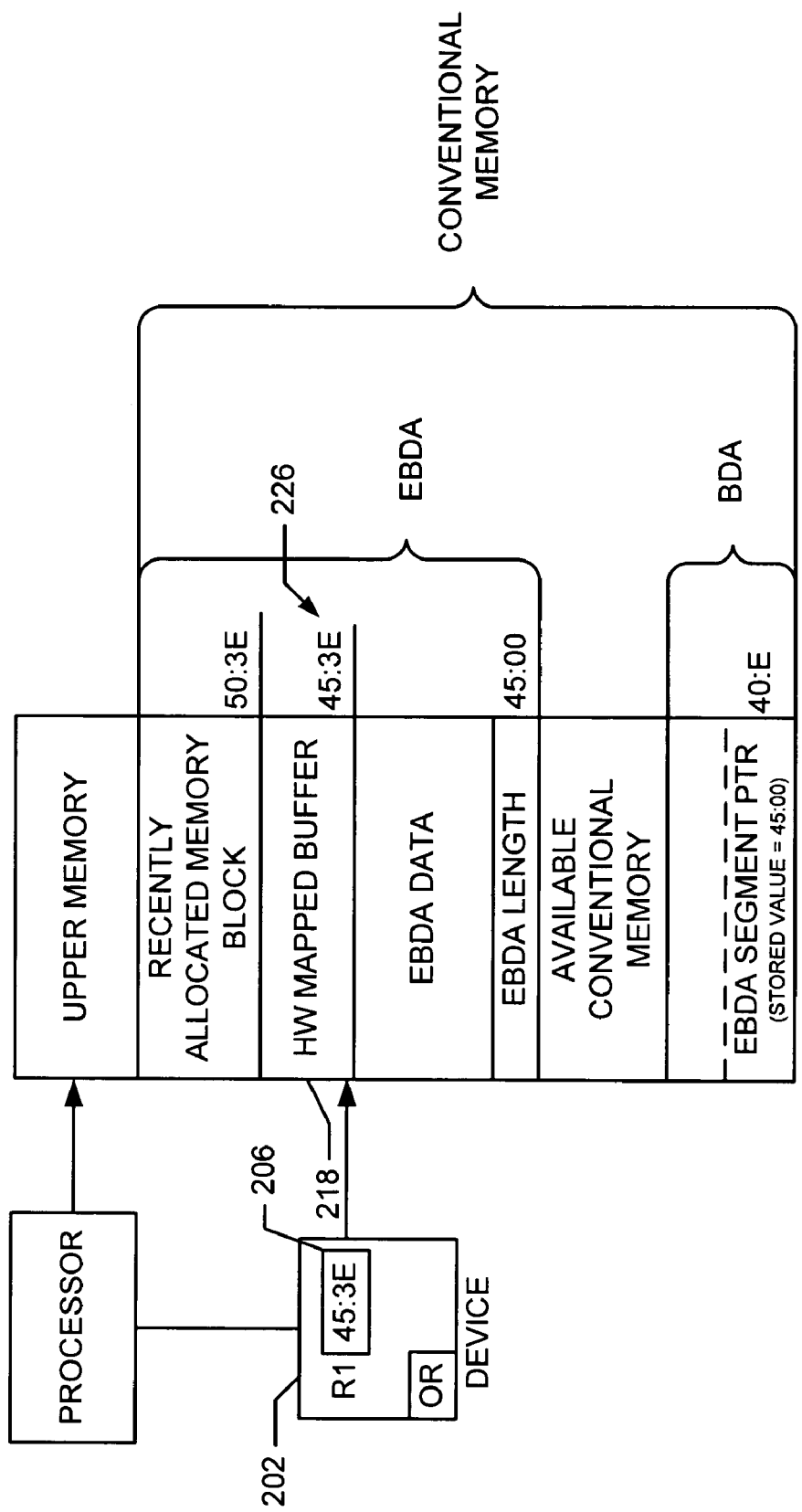
FIG. 6 is a diagram illustrating the hardware device of FIGS. 2 and 4 configured to access the hardware mapped buffer of FIGS. 2 and 4 that has been relocated by a memory relocation process.

FIG. 6 is a diagram illustrating a hardware device (e.g., the device 202) configured to access a corresponding hardware mapped buffer (e.g., the hardware mapped buffer 218) that has been relocated by a memory relocation process. In particular, the example process 312 described in detail above in connection with FIG. 5 is used to store the hardware mapped buffer starting address 226 in the address register 206. In this manner, the device 202 may use the absolute address stored in the address register 206 to access the hardware mapped buffer 218 as indicated in FIG. 6 using direct memory addressing.

Figure 7:
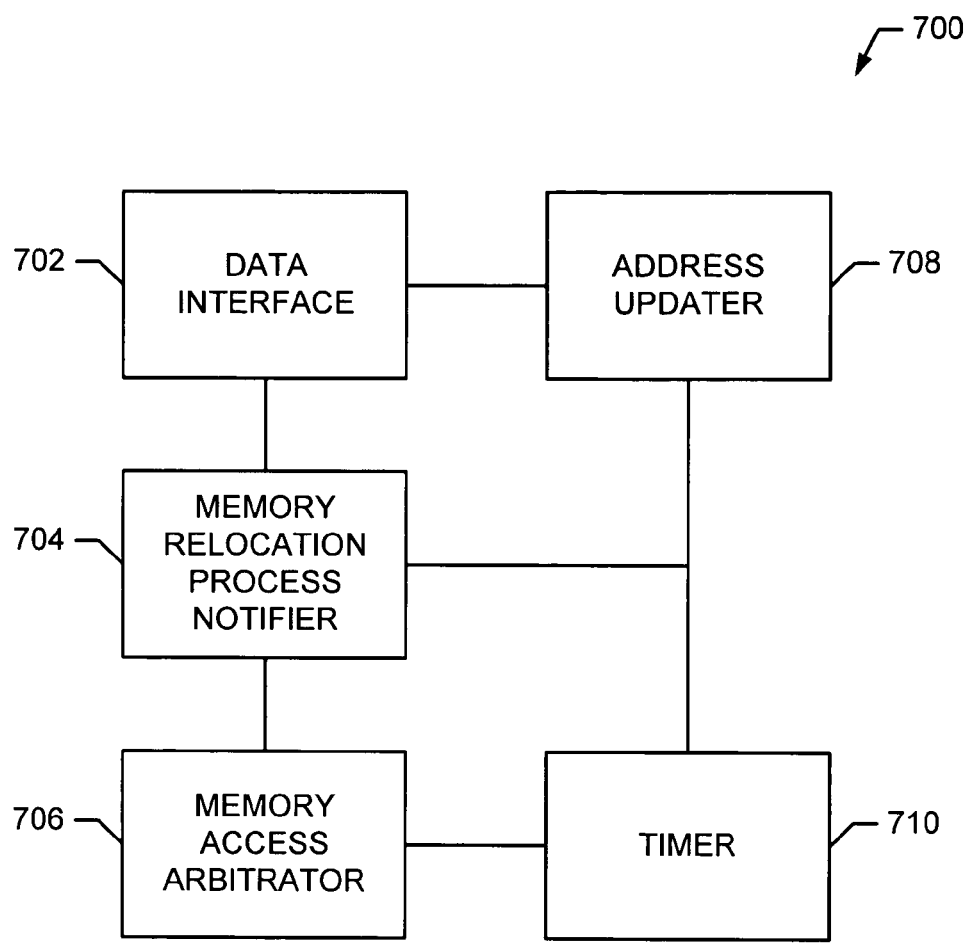
FIG. 7 is a block diagram of an example system that may be used to implement the methods and apparatus described herein.

FIG. 7 is a block diagram of an example system 700 that may be used to implement the methods and apparatus described herein. In particular, the example system 700 may be used to implement the methods described above in connection with FIGS. 3 and 5. As shown in FIG. 7, the example system 700 includes a data interface 702, a memory relocation process notifier 704, a memory access arbitrator 706, an address updater 708, and a timer 710, all of which are communicatively coupled as shown.

The data interface 702 may be communicatively coupled to any memory (e.g., one or both of the system memory 104 and the mass storage memory 106 of FIG. 1), register (e.g., the address register 206 of FIGS. 2, 4, and 6), and/or any other data storage device. The data interface 702 may be used in several manners. For example, the data interface 702 may be configured to store and/or retrieve information associated with accessing memory blocks. More specifically, in one example, the data interface 702 may be used to retrieve an absolute address stored in the address register 206. The data interface 702 may also be used to access addresses or any other information stored in the system memory 104. For example, the data interface 702 may be used to access addresses stored in the EBDA segment pointer 216 of FIGS. 2 and 4. The data interface 702 may be configured to communicate information to and receive information from, for example, the address updater 708.

The memory relocation process notifier 704 may be configured to generate notifications associated with occurrences of memory relocation processes. In one example, the memory relocation process notifier 704 may be configured to detect that a memory relocation process has started using any suitable method including the methods described above in connection with the operation of block 304 (FIG. 3). More specifically, the memory relocation process notifier 704 may be configured to set one or more memory breakpoints using, for example, a debug register. The memory breakpoints may be associated with accesses to memory locations within the system memory 104 (FIGS. 1 and 2). The memory relocation process notifier 704 may then operate in combination with the data interface 704 to access an interrupt register and determine if the memory breakpoint has invoked or asserted an interrupt.

Additionally or alternatively, the memory relocation process notifier 704 may include a comparator to determine if the information stored in the EBDA segment pointer 216 and/or the EBDA length 220 is different from information stored therein during previous write accesses to those locations as described above in connection with the operation of block 304 (FIG. 3).

The memory access arbitrator 706 may be configured to control accesses to information stored in memory blocks (e.g., the hardware mapped buffer 218 of FIGS. 2, 4, and 6). For example, the memory access arbitrator 706 may receive a notification or assertion from the memory relocation process notifier 704 indicating that a memory relocation process has started. The memory access arbitrator 706 may then prevent or disable the device 202 (FIGS. 2, 4, and 6) from accessing the hardware mapped buffer 218 as described above in connection with the operation of block 306 (FIG. 3). Additionally, the memory access arbitrator 706 may also receive a notification or assertion from the timer 710 indicating that a memory relocation process is complete. The memory access arbitrator 706 may then enable the device 202 to access the hardware mapped buffer 218 as described above in connection with the operation of block 314 (FIG. 3).

The address updater 708 may be configured to determine and update absolute addresses associated with relocated memory blocks that are accessed using direct memory addressing such as, for example, the hardware mapped buffer 218 (FIGS. 2, 4, and 6). For example, the address updater 708 may receive a notification or assertion from the timer 710 indicating that a memory relocation process is complete. The address updater 708 may then determine absolute addresses of relocated memory blocks as described above in connection with the example address update process 312 of FIGS. 3 and 5. The address updater 708 may then use the data interface 702 to store the absolute addresses in respective storage locations such as, for example, in the address register 206 (FIGS. 2, 4, and 6).

The timer 710 may be used to determine when a memory relocation process is complete. For example, the timer 710 may be set as described above in connection with the operation of block 308 (FIG. 3). The timer 710 may be configured to expire and assert an interrupt or to communicate a notification or assertion to the address updater 708 indicating that the duration of time required by a memory relocation process is complete.

In an alternate configuration of the example system 700, the timer 710 may be integral with the memory relocation process notifier 704. In this manner, the timer 710 may cause the memory relocation process notifier 704 to communicate a notification or assertion to the address updater 708 indicating that the memory relocation process is complete.

The methods described herein may be implemented using instructions stored on a computer readable medium that are executed by, for example, the processor 102 (FIGS. 1 and 2). The computer readable medium (i.e., a machine accessible medium) may include any desired combination of solid state, magnetic, and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to manage memory access, comprising:
    executing instructions associated with a basic input output system (BIOS) to:
    detect a memory relocation process in a pre-boot environment prior to initializing a memory device, wherein the memory relocation process comprises allocating a memory block in conventional memory space and initializing an extended BIOS data area in the memory block;
    disable memory access to the extended BIOS data area in response to detecting the memory relocation process;
    determine an absolute address value associated with the memory block;
    store the absolute address value in a peripheral hardware device configured to access the conventional memory;
    write first memory contents from a second memory block in the conventional memory space to the memory block;
    write second memory contents associated with a second peripheral hardware device to the second memory block; and
    store a second absolute address value associated with the second memory block in the second peripheral hardware device.

2. A method as defined in claim 1, further comprising executing the instructions associated with the basic input output system to:
    detect that the memory relocation process is complete; and
    enable memory access to the memory block.

3. A method as defined in claim 2, wherein detecting that the memory relocation process is complete comprises detecting an interrupt.

4. A method as defined in claim 1, further comprising executing the instructions associated with the basic input output system to access the memory block based on the absolute address value.

5. A method as defined in claim 1, wherein detecting the memory relocation process comprises detecting a change of information stored in a memory location.

6. A method as defined in claim 5, wherein the memory location is at least one of an extended basic input output system segment pointer or an extended basic input output system length area.

7. A method as defined in claim 5, wherein detecting the change of information stored in the memory location comprises using a debug register to set a memory breakpoint at the memory location.

8. A method as defined in claim 7, wherein detecting the memory relocation process comprises determining that an interrupt associated with the memory breakpoint is asserted.

9. An apparatus comprising:
    a processor system including a basic input output system (BIOS) memory; and
    instructions stored in the basic input output system memory that enable the processor system to:
        detect a memory relocation process in a pre-boot environment prior to initializing a memory device, wherein the memory relocation process comprises allocating a memory block in conventional memory space and initializing an extended BIOS data area in the memory block;
        disable memory access to the extended BIOS data area in response to detecting the memory relocation process;
        determine an absolute address value associated with the memory block;
        store the absolute address value in a peripheral hardware device configured to access the conventional memory;
        write first memory contents associated with the peripheral hardware device from a second memory block in the conventional memory space to the memory block;
        write second memory contents associated with a second peripheral hardware device to the second memory block; and
        store a second absolute address value associated with the second memory block in the second peripheral hardware device.

10. An apparatus as defined in claim 9, wherein the instructions stored in the basic input output system memory enable the processor system to:
    detect that the memory relocation process is complete; and
    enable memory access to the memory block.

11. An apparatus as defined in claim 10, wherein the instructions stored in the basic input output system memory enable the processor system to detect that the memory relocation process is complete by determining that a timer has expired.

12. An apparatus as defined in claim 9, wherein the instructions stored in the basic input output system memory enable the processor system to access the memory block based on the absolute address value.

13. An apparatus as defined in claim 9, wherein the instructions stored in the basic input output system memory enable the processor system to detect the memory relocation process by detecting a change of information stored in a memory location.

14. An apparatus as defined in claim 13, wherein the memory location is at least one of an extended basic input output system segment pointer or an extended basic input output system length area.

15. An apparatus as defined in claim 13, wherein the instructions stored in the basic input output system memory enable the processor system to detect the change of information stored in the memory location by using a debug register to set a memory breakpoint at the memory location.

16. An apparatus as defined in claim 15, wherein the instructions stored in the basic input output system memory enable the processor system to detect the memory relocation process by determining that an interrupt associated with the memory breakpoint is asserted.

17. A machine accessible medium having instructions stored thereon that, when executed, cause a machine to:
    execute a basic input output system (BIOS) to:
        detect a memory relocation process in a pre-boot environment prior to initializing a memory device, wherein the memory relocation process comprises allocating a memory block in conventional memory space and initializing an extended BIOS data area in the memory block;
        disable memory access to the extended BIOS data area in response to detecting the memory relocation process;
        determine an absolute address value associated with the memory block;
        store the absolute address value in a peripheral hardware device configured to access the conventional memory;
        write first memory contents associated with the peripheral hardware device from a second memory block in the conventional memory space to the memory block;
        write second memory contents associated with a second peripheral hardware device to the second memory block; and
        store a second absolute address value associated with the second memory block in the second peripheral hardware device.

18. A machine accessible medium as defined in claim 17 having instructions stored thereon that, when executed, cause the machine to execute the basic input output system to:
    detect that the memory relocation process is complete; and
    enable memory access to the memory block.

19. A machine accessible medium as defined in claim 18 having instructions stored thereon that, when executed, cause the machine to execute a basic input output system to detect that the memory relocation process is complete by determining that a timer has expired.

20. A machine accessible medium as defined in claim 17 having instructions stored thereon that, when executed, cause the machine to execute a basic input output system to access the memory block based on the absolute address value.

21. A machine accessible medium as defined in claim 17 having instructions stored thereon that, when executed, cause the machine to execute a basic input output system to detect the memory relocation process by detecting a change of information stored in a memory location.

22. A machine accessible medium as defined in claim 21, wherein the memory location is at least one of an extended basic input output system segment pointer or an extended basic input output system length area.

23. A machine accessible medium as defined in claim 21 having instructions stored thereon that, when executed, cause the machine to execute a basic input output system to detect the change of information stored in the memory location by using a debug register to set a memory breakpoint at the memory location.

24. A machine accessible medium as defined in claim 23 having instructions stored thereon that, when executed, cause the machine to execute a basic input output system to detect the memory relocation process by determining that an interrupt associated with the memory breakpoint is asserted.

25. A system to manage memory access, comprising:
    a memory relocation process notifier configured to generate a notification in a pre-boot environment prior to initializing a memory device, wherein the notification is associated with a memory relocation process to re-allocate a first hardware mapped buffer in an extended basic input output system data area in response to allocation of a second hardware mapped buffer requested by an option read only memory;
    a memory access arbitrator communicatively coupled to the memory relocation process notifier and configured to control memory access to a memory block;
    an address updater communicatively coupled to the memory relocation process notifier and configured to determine an absolute address associated with the memory block; and
    a data interface configured to:
        store the absolute address value in a peripheral hardware device configured to access the memory block;
        write first memory contents associated with the peripheral hardware device from a second memory block to the memory block;
        write second memory contents associated with a second peripheral hardware device to the second memory block; and
        store a second absolute address value associated with the second memory block in the second peripheral hardware device.

26. A system as defined in claim 25, wherein the memory relocation process notifier is configured to use a debug register to set a memory breakpoint at an address associated with the memory relocation process.

27. A system as defined in claim 26, wherein the memory access arbitrator is configured to control memory accesses to the memory block by disabling accesses to the memory in response an interrupt associated with the memory breakpoint.

* * * * *